US010364173B2

(12) United States Patent
Seth et al.

(10) Patent No.: US 10,364,173 B2
(45) Date of Patent: Jul. 30, 2019

(54) SYSTEMS AND METHODS FOR TREATING OILFIELD WASTEWATER (71) Applicant: FMC Technologies, Inc., Houston, TX (US)

(72) Inventors: Kushal Seth, Houston, TX (US); Eduardo Candia, Magnolia, TX (US); Paulus Henricus Joannes Verbeek, Voorhout (NL); Govert Lammert Kruijtzer, Gelderland (NL); Clint G. Todd, Evanston, WY (US); Sergio Arreola, Jr., Pearland, TX (US); Kelly P. Ciprick, Englewood, CO (US); Suman Kalyan Hajra, Katy, TX (US); Thomas Krebs, Doorwerth (NL)

(73) Assignee: FMC Technologies, Inc., Houston, TX (US)

( * ) Notice: Subject to any disclaimer, the term of this patent is extended or adjusted under 35 U.S.C. 154(b) by 662 days.

(21) Appl. No.: 14/960,939

(22) Filed: Dec. 7, 2015

(65) Prior Publication Data
US 2017/0158538 A1 Jun. 8, 2017

(51) Int. Cl.
C02F 1/00 (2006.01)
C02F 1/24 (2006.01)
(Continued)

(52) U.S. Cl.
CPC .............. *C02F 9/005* (2013.01); *B01D 61/16* (2013.01); *B01D 71/021* (2013.01); *B01D 71/56* (2013.01);
(Continued)

(58) Field of Classification Search
CPC .. C02F 9/005; C02F 9/00; C02F 1/463; C02F 1/24; C02F 1/004; C02F 1/444;
(Continued)

(56) References Cited

U.S. PATENT DOCUMENTS 5,350,525 A * 9/1994 Shaw ..................... B01D 17/00
210/512.2
5,879,562 A 3/1999 Garbutt
(Continued)

FOREIGN PATENT DOCUMENTS

CN 101363311 A 2/2009
CN 202280449 U 6/2012
(Continued)

OTHER PUBLICATIONS

International Search Report and Written Opinion dated Feb. 14, 2017 for International Patent Application No. PCT/US2016/064304 filed on Dec. 1, 2016.
(Continued)

Primary Examiner — David A Reifsnyder
(74) Attorney, Agent, or Firm — Amerson Law Firm, PLLC (57) ABSTRACT A wastewater treatment system is disclosed that includes a desanding hydrocyclone, a deoiling hydrocyclone, an electrocoagulation apparatus that is adapted to receive a flow of treated wastewater from the desanding and deoiling hydrocyclones, a floc separator that is adapted to receive a flow of a first effluent from the electrocoagulation apparatus, and an ultrafiltration membrane apparatus that is adapted to receive at least a portion of a flow of a second effluent from the floc separator.

29 Claims, 3 Drawing Sheets (51) Int. Cl.
| | |
|---|---|
| *C02F 1/38* | (2006.01) |
| *C02F 1/40* | (2006.01) |
| *C02F 1/44* | (2006.01) |
| *C02F 1/52* | (2006.01) |
| *C02F 9/00* | (2006.01) |
| *B01D 61/14* | (2006.01) |
| *B01D 61/16* | (2006.01) |
| *B01D 71/02* | (2006.01) |
| *B01D 71/56* | (2006.01) |
| *C02F 1/463* | (2006.01) |
| *C02F 11/12* | (2019.01) |
| *E21B 43/34* | (2006.01) |
| *C02F 101/20* | (2006.01) |
| *C02F 101/32* | (2006.01) |
| *C02F 103/10* | (2006.01) |
| *C02F 103/36* | (2006.01) |

(52) U.S. Cl.
CPC ............... *C02F 1/004* (2013.01); *C02F 1/24* (2013.01); *C02F 1/38* (2013.01); *C02F 1/444* (2013.01); *C02F 1/463* (2013.01); *C02F 9/00* (2013.01); *E21B 43/34* (2013.01); *B01D 61/145* (2013.01); *B01D 2311/2642* (2013.01); *B01D 2311/2649* (2013.01); *B01D 2311/2676* (2013.01); *B01D 2311/2684* (2013.01); *B01D 2321/00* (2013.01); *B01D 2321/16* (2013.01); *C02F 1/001* (2013.01); *C02F 1/40* (2013.01); *C02F 1/52* (2013.01); *C02F 11/12* (2013.01); *C02F 2101/20* (2013.01); *C02F 2101/32* (2013.01); *C02F 2103/10* (2013.01); *C02F 2103/365* (2013.01); *C02F 2201/008* (2013.01); *C02F 2301/08* (2013.01); *C02F 2303/04* (2013.01); *C02F 2303/16* (2013.01); *C02F 2303/24* (2013.01)

(58) Field of Classification Search
CPC .... C02F 1/38; C02F 11/12; C02F 1/52; C02F 2101/20; C02F 2101/32; C02F 2303/24; C02F 2201/008; B01D 61/16; B01D 61/145; B01D 2321/16; B01D 2311/2684; B01D 2311/2676; B01D 2311/2649; B01D 2311/2642; E21B 43/34
See application file for complete search history.

(56) References Cited

U.S. PATENT DOCUMENTS

| | | | |
|---|---|---|---|
| 6,749,757 B2 | 6/2004 | Smith et al. | |
| 7,147,788 B2 * | 12/2006 | Tveiten | B04C 5/26 |
| | | | 210/512.2 |
| 7,815,804 B2 | 10/2010 | Nagghappan | |
| 7,943,087 B2 | 5/2011 | McGuire et al. | |
| 8,347,960 B2 | 1/2013 | Mothersbaugh et al. | |
| 8,431,010 B2 | 4/2013 | Norris | |
| 8,464,971 B1 | 6/2013 | Munisteri | |
| 8,490,695 B2 | 7/2013 | Bahorich et al. | |
| 2007/0235391 A1 | 10/2007 | Ylikangas et al. | |
| 2009/0159512 A1 | 6/2009 | Brattested | |
| 2009/0294375 A1 | 12/2009 | Lange et al. | |
| 2010/0006476 A1 | 1/2010 | Folkvang | |
| 2011/0284471 A1 | 11/2011 | Ylikangas | |
| 2012/0132079 A1 | 5/2012 | Naess et al. | |
| 2012/0312755 A1 | 12/2012 | Ryan et al. | |
| 2013/0026082 A1 | 1/2013 | Al-Shafei et al. | |
| 2013/0048575 A1 | 2/2013 | Gruber et al. | |
| 2013/0199918 A1 | 8/2013 | Jones et al. | |
| 2013/0207283 A1 | 8/2013 | Rabe et al. | |
| 2014/0262095 A1 | 9/2014 | Kemp et al. | |
| 2014/0262279 A1 | 9/2014 | Greene et al. | |

FOREIGN PATENT DOCUMENTS

| | | | | |
|---|---|---|---|---|
| CN | 202832312 U | 3/2013 | | |
| CN | 104803555 A | 7/2015 | | |
| WO | 2012136064 A1 | 10/2012 | | |
| WO | 2013078124 A1 | 5/2013 | | |
| WO | WO-2013078124 A1 * | 5/2013 | ............... | C02F 9/00 |

OTHER PUBLICATIONS

Fakhru'l-Razi a Et Al: "Review of Technologies for Oil and Gas Produced Water Treatment", Journal of Hazardous Materials Elsevier, vol. 170, No. 2-3, Oct. 30, 2009, pp. 530-551.
Halliburton Brochure for CleanWave Mini-Water Treatment Service, Electrocoagulation Technology for Water Recycling, 2013.
Halliburton Brochure for CleanWave System Core Capabilities.
FMC Technologies Brochure for Compact Total Separation Systems, Feb. 2011.
E&P Focus, Oil & Natural Gas Program Newsletter, Fall 2013.
U.S. Department of the Interior Bureau of Reclamation Brochure, Microfiltration (MF) and Ultrafiltration (UF), Sep. 20, 2010.
U.S. Department of the Interior Bureau of Reclamation Brochure, Oil and Gas Produced Water Management and Beneficial Use in the Western United States, Sep. 2011.
FMC Technologies Brochure, Produced Water Separation Systems, Jul. 2011.
FMC Technologies Brochure, Separation Systems, Internals—State-of-the-Art Separation Technology, Feb. 2011.
FMC Technologies Brochure, Separation Systems, Solids Handling, Aug. 2010.
Lewis, "Wastewater Generation and Disposal from Natural Gas Wells in Pennsylvania," Nicholas School of the Environment, Duke University, May 2012.

* cited by examiner

SYSTEMS AND METHODS FOR TREATING OILFIELD WASTEWATER

BACKGROUND

1. Field of the Disclosure

The present disclosure is generally directed to systems and methods for treating oilfield wastewater, and in particular to mobile systems that may be used to treat wastewater that is generated from a variety of sources during drilling and completion operations.

2. Description of the Related Art

Large amounts of water are often necessary to facilitate the drilling and completion activities performed on modern oil and gas wells. In many cases, an even greater amount of wastewater can be generated that during these operations must be handled in some fashion, such as by treatment, reuse, disposal, and the like. The wastewater generated during drilling and/or completion operations can come from a variety of different sources, each of which may have different components and/or characteristics that may have an influence on how the wastewater is handled.

For example, one major source of oilfield wastewater is so-called "produced water," which generally is naturally-occurring water that is trapped in underground formations where oil and gas are found, and that comes to the surface during oil and gas exploration and production. Because the water has been in contact with the hydrocarbon-bearing formation for an extended period of time—millions of years, in most cases—it contains some of the chemical characteristics of the formation as well as that of the hydrocarbon itself. When extracted, the oil or gas is brought to the surface along with this produced water as a combined fluid. As such, the composition of the produced fluid will typically include a mixture of liquid and/or gaseous hydrocarbons, produced water, dissolved or suspended solids, produced solids such as sand or silt, and other fluids or chemicals that may have been injected into the formation during exploration and production activities. Therefore, produced water is not simply a single recognizable commodity, as its physical and chemical properties can vary considerably depending on the geographic location of the field, the geological host formation, and the type of hydrocarbon product being produced. Furthermore, the properties of produced water, as well as the volume of produced water, can vary throughout the life of a given well or reservoir.

The U.S. Department of Energy (DOE) has characterized produced water as "by far the largest volume byproduct or waste stream associated with oil and gas exploration and production." As recently as 2009, studies have shown that approximately 21 billion barrels of produced water are generated each year in the United States from nearly a million wells—which represents about 57 million barrels per day, or 2.4 billion gallons per day—and that more than 50 billion barrels of produced water are generated each year at thousands of wells in countries other than the United States.

Early in the life of a well, oil production is typically high and water production is low. However, over the life of a well, oil production will generally decrease, whereas water production will increase. The DOE estimates that the average ratio of produced water-to-oil on a worldwide basis is in the range of 2:1 to 3:1, however the estimated U.S. average falls somewhere between 5:1 and 8:1. This is due to the fact that many U.S. fields are more mature and therefore past their peak production, although the actual average ratio in the U.S. could be even higher, because produced water is not always measured directly. Furthermore, a produced water-to-oil ratio in excess of 50:1 can be found in many older wells in the U.S. and elsewhere.

Another major source of wastewater that is generated during oil and/or gas well drilling operations is "flowback" or "frac water" from hydraulic fracturing operations. Hydraulic fracturing is a common enhancement method that is often used for stimulating the production of oil and/or gas, particularly in hydrocarbon-bearing shale formations. The fracturing fluid, sometimes referred to as "fracing fluid," is typically a mixture of water and proppant particulates, which may include sand and/or synthetic material, as well as a variety of chemicals that are often added so as to aid in proppant transport, friction reduction, wettability, pH control, bacterial control, and the like. The fracing process involves injecting a fracing fluid down a well bore at a sufficiently high hydraulic pressure so that the fracing fluid penetrates the producing formation and creates underground cracks or fractures in the formation, or extends any existing fissures. The proppant particulates then acts to "prop" the cracks or fissures open, thus allowing at least some of the fracing fluid to "flow back" into the wellbore and out of the well, along with some amount of the naturally-occurring water that may be present in the formation. In many instances, the fracing process is repeated a multiple number of times on a given well, in which case the well head is closed between stages so to maintain the hydraulic pressure of the fracing fluid for an extended period of time.

The flowback or frac water flows back to the surface during and after the completion of the hydraulic fracturing operation. The composition of flowback is generally characteristic of the original fracing fluid that is used to fracture the formation, however the physical and chemical properties of flowback can vary considerably depending on the geographic location of the well, the specific makeup of the geological formation, and any other chemicals that might be introduced into the well during the drilling and fracturing operations. Most flowback will occur within the first seven to ten days of the fracing operation, while the rest can occur over a period of three to four weeks or more.

Varying amounts of water are required in a typical hydraulic fracturing operation, however it is not uncommon to use anywhere from one to four million gallons of water to fracture the formations of a single oil or gas well. Furthermore, some wells may require even greater quantities of water depending on the length of the fracture and the depth of the frac zone. Generally, the water is trucked or piped to the well site from other locations, typically in very large quantities, and may come from a variety of different sources, including untreated water from rivers, lakes, streams, ponds, or water wells, or it may be purchased from a municipal water utility. Accordingly, it should be appreciated that there is a substantial cost associated with obtaining, shipping, and storing the water that is used for performing a typical fracing operation.

While produced water and flowback often represent a significant percentage of the total amount of wastewater that is generated during oil and gas well operations, other sources and operations can also contribute to the generation of wastewater. For example, some amounts of wastewater are typically generated when plugs that are used to separate the various production zones of a well are drilled out, sometimes referred to as "coiled tubing water" or "coiled tubing drill-out waste." Various other rig operations may also contribute to the generation of wastewater, such as drilling fluid treatment waste, storage impurity sediments, spent lubricants, and/or well servicing fluids and the like, which are sometimes generically and collectively referred to as "pit water."

In general, most if not all of the wastewater that is generated during these various operations—e.g., produced water, flowback, coiled tubing water, pit water, etc.—is pumped to and held in large holding ponds or tanks that are created adjacent to the well site. Handling of the wastewater thereafter generally depends on its subsequent disposition, such as by disposal and/or reuse.

For example, in some cases, the most economical manner of handling the wastewater may simply be to dispose of the wastewater, either by reinjecting it into commercial underground reinjection sites or by discharging it into waterways. In other cases, it may be desirable to reuse at least some of the wastewater for operations at the well site, such as for further fracing operations and the like. However, irrespective of the ultimate disposition method—i.e., by disposal and/or reuse—some amount of treatment of the wastewater is generally required.

Treating wastewater from oil and gas operations that is primarily composed of produced water and flowback often entails removing a variety of different chemical constituents and dissolved solids from the wastewater. Furthermore, the degree to which these chemical constituents and solids must be removed is generally dependent on the treated wastewater disposition method. Accordingly, while removing only minimal amounts of the various chemical constituents and total dissolved solids from the wastewater may render it marginally suitable for disposal by reinjection it into underground sites, such minimal treatment may be insufficient to allow the treated wastewater to be reused in hydraulic fracturing operations, which typically requires a more extensive wastewater treatment. Similarly, the level of contaminant removal that is necessary to permit the treated wastewater to be discharged into waterways generally well exceeds the commensurate levels that that may be allowed for both reinjection disposal and fracing reuse. Accordingly, a variety of different water treatment options are often necessary in order to meet all of these competing objectives.

Furthermore, the method of disposition and the degree of treatment often dictates whether or not the wastewater can be economically treated on site, due to limited treatment capabilities of most commonly available mobile wastewater treatment systems. For example, when only minimal treatment of the wastewater is required, such as when the wastewater is ultimately disposed of by way of subterranean reinjection, it may be feasible to perform such minimal treatment at the well site prior to trucking the wastewater to the reinjection sites. However, other than systems that utilize very large, high residence time settling tanks—which typically have a very large well site footprint—most commercially available mobile treatment systems are generally incapable of treating wastewater from oil and gas operations to a sufficient degree that would allow the water to be reused for fracing operations, much less to a level that would permit the treated water to be discharged in waterways and the like. In such cases, the wastewater must first be trucked from the well site to water treatment facilities, after which it must be trucked back to the well site for reuse in fracing operations, or trucked to separate disposal sites. In either instance, the costs associated with trucking the wastewater to offsite facilities for treatment can often have a significant impact on the economic viability of the well. Furthermore, the large quantities of water required for hydraulic fracing, together with the additional chemicals and/or other contaminants that are often present in fracing water flowback, only tend to exacerbate the wastewater treatment issues that have long been associated with produced water and other wastes from oil and gas operations. Accordingly, operators are continuously seeking ways to reduce the costs and environmental impact associated with handling and treating the large amounts wastewater that are generated during oil and gas exploration, drilling, and completion activities.

The present disclosure is therefore directed to methods and systems for treating oil and gas wastewater that may be used to address one or more of the various issues outlined above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

The present disclosure is generally directed to systems and methods for treating oilfield wastewater, and in particular to mobile treatment systems that may be used to treat wastewater that is generated from a variety of sources during oilfield drilling and completion operations. In one exemplary embodiment, wastewater treatment system is disclosed that includes, among other things, a desanding hydrocyclone, a deoiling hydrocyclone, an electrocoagulation apparatus that is adapted to receive a flow of treated wastewater from the desanding and deoiling hydrocyclones, a floc separator that is adapted to receive a flow of a first effluent from the electrocoagulation apparatus, and an ultrafiltration membrane apparatus that is adapted to receive at least a portion of a flow of a second effluent from the floc separator.

In another illustrative embodiment of the present disclosure, an exemplary mobile wastewater treatment system includes at least one mobile trailer or movable skid and a desanding hydrocyclone and a deoiling hydrocyclone mounted on the at least one mobile trailer or movable skid, wherein the desanding hydrocyclone and the deoiling hydrocyclone are adapted to receive a flow of wastewater. The mobile wastewater treatment system further includes, among other things, an electrocoagulation apparatus and a floc separator that are also mounted on the at least one mobile trailer or movable skid, wherein the electrocoagulation apparatus is adapted to receive a flow of a substantially desanded and deoiled effluent exiting one of the desanding hydrocyclone and the deoiling hydrocyclone, and wherein the floc separator is adapted to remove agglomerated solids formed in the electrocoagulation apparatus from a flow of an effluent exiting the electrocoagulation apparatus. Additionally, the exemplary mobile wastewater treatment system includes an ultrafiltration membrane apparatus mounted on at least one mobile trailer or movable skid, wherein the ultrafiltration membrane apparatus is adapted to remove solids particles from at least a portion of a flow of an effluent exiting the floc separator.

Also disclosed herein is an illustrative method for treating wastewater with a wastewater treatment assembly, wherein the method includes directing a flow of wastewater to the wastewater treatment system and separating hydrocarbons and first solids particles from the flow of wastewater with first and second hydrocyclones of the wastewater treatment system. The exemplary method also includes, among other things, treating a flow of a first effluent exiting one of the first and second hydrocyclones in an electrocoagulation apparatus of the wastewater treatment system so as to form agglomerated solids from waste material present in the flow of the first effluent. Furthermore, agglomerated solids are removed from a flow of a second effluent exiting the electrocoagulation apparatus with a floc separator of the wastewater treatment system and second solids particles are separated from at least a portion of a flow of a third effluent exiting the floc separator in an ultrafiltration membrane apparatus of the wastewater treatment system.

BRIEF DESCRIPTION OF THE DRAWINGS

The disclosure may be understood by reference to the following description taken in conjunction with the accompanying drawings, in which like reference numerals identify like elements, and in which.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In the following detailed description, various details may be set forth in order to provide a thorough understanding of the various exemplary embodiments disclosed herein. However, it will be clear to one skilled in the art that some illustrative embodiments of the invention may be practiced without some or all of these such various disclosed details. Furthermore, features and/or processes that are well-known in the art may not be described in full detail so as not to unnecessarily obscure the disclosed subject matter. In addition, like or identical reference numerals may be used to identify common or similar elements.

Figure 1:
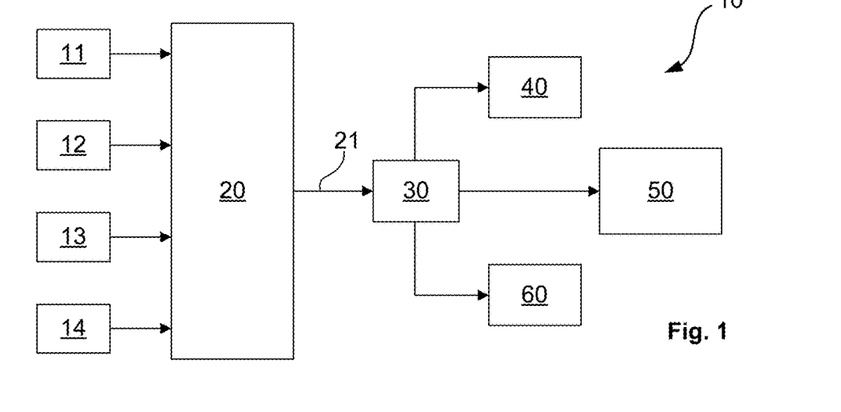
FIG. 1 is a schematic fluid flow diagram of a portion of an oilfield wastewater treatment process that illustrates oilfield wastewater flowing to, and recovered hydrocarbons, discharged waste, and treated water flowing from, an exemplary wastewater treatment system of the present disclosure.

The present invention relates generally to wastewater treatment systems, and in particular to mobile wastewater treatment systems that may be used to treat the various types of wastewater that are typically generated during oil and gas well exploration, drilling, and completion operations, and which provide distinct and novel advantages over the systems that are presently available for such wastewater treatment activities. Turning to FIG. 1, a portion of an oilfield wastewater treatment process 10 fluid flow diagram is schematically depicted that shows a flow of oilfield wastewater 21 from a wastewater storage tank or retention pond 20 to a wastewater treatment system 30 in accordance with one illustrative embodiment of the present disclosure. As noted previously, the wastewater in the wastewater retention pond 20 may come from a variety of different oilfield operations and sources, such as, for example, produced water 11, frac water or flowback 12, coiled tubing water 13, and/or pit water 14. In certain embodiments, the treatment system 30 is adapted to receive the flow of wastewater 21 from the retention pond 20 and treat the wastewater 21 so as to separate and recover the valuable hydrocarbons 40 and send them back to the operator, to remove undesirable contaminants and wastes 60, and to provide a flow of treated water 50 that is suitable for any one of the various disposition methods described above—i.e., reinjection into subterranean formations, reuse for facing operations, and/or discharge into waterways and the like.

In some illustrative embodiments, the wastewater treatment system 30 may include a variety of different wastewater treatment apparatuses, any one or more of which may be employed to provide the desired degree of treatment of the wastewater stream 21, depending on the ultimate disposition of the wastewater 21, as previously described. For example, in at least one embodiment, the treatment system 30 may include, among other things, a desanding hydrocyclone 102, a deoiling hydrocyclone 104, an electrocoagulation apparatus 106, a floc separator 108, a filter apparatus 110, an ultrafiltration membrane apparatus 112, and a chemical conditioning apparatus 116, as will be further described with respect to the illustrative embodiments depicted in FIGS. 2A and 2B below.

In certain embodiments, an initial treatment of the wastewater stream 21 may be accomplished through cyclonic separation of hydrocarbons (such as oil and/or gas) and larger solids particles (such as sand and/or silt) in the desanding and deoiling hydrocyclones 102 and 104, respectively. After cyclonic separation, further treatment of the wastewater stream 21 may be performed using the electrocoagulation apparatus 106, which is adapted to treat suspended solids, bacterial agents, and/or heavy metals and the like. Additionally, in at least one embodiment, the chemical conditioning apparatus 116 may be used to deliver chemical binding agents downstream of the electrocoagulation apparatus 106 during water treatment so as to increase the density and size of the agglomerated solids created during the electrocoagulation process, thus facilitating easier floc removal in the floc separator 108, as will be further described with respect to FIGS. 2A and 2B below. In some exemplary embodiments, the floc separator 108 may be, for example, a compact floatation unit (CFU) and the like, which generally minimizes the fluid and solid shear and thus provides sufficient floc growth and floc/bubble interaction with the least amount of liquid inventory.

Figure 2A:
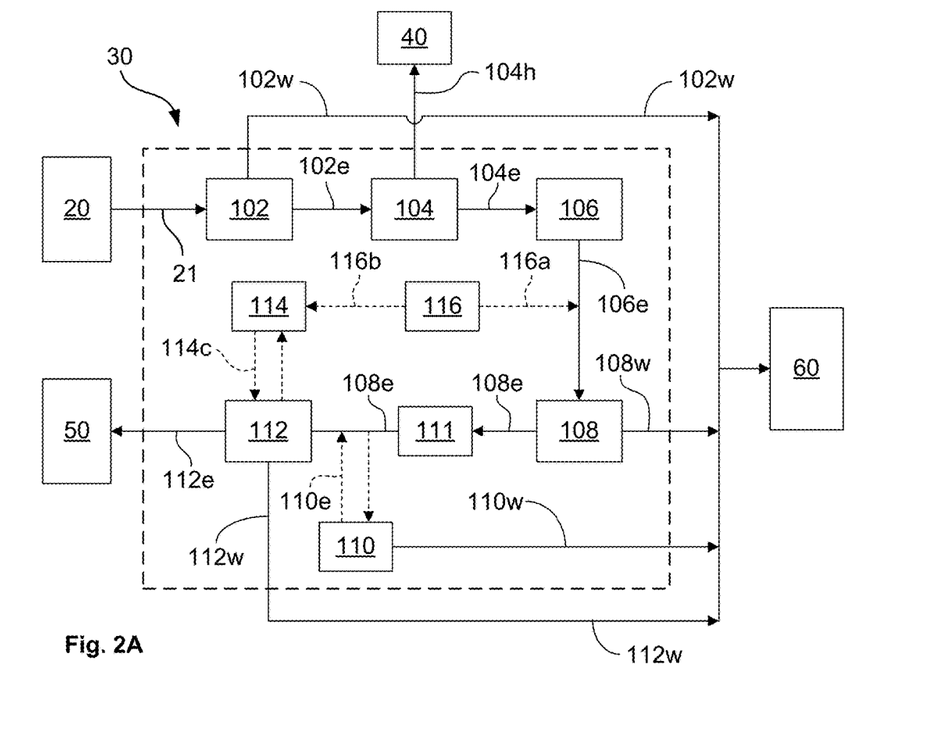
FIG. 2A is a schematic depiction of one illustrative embodiment of the wastewater treatment system shown in FIG. 1.
Figure 2B:
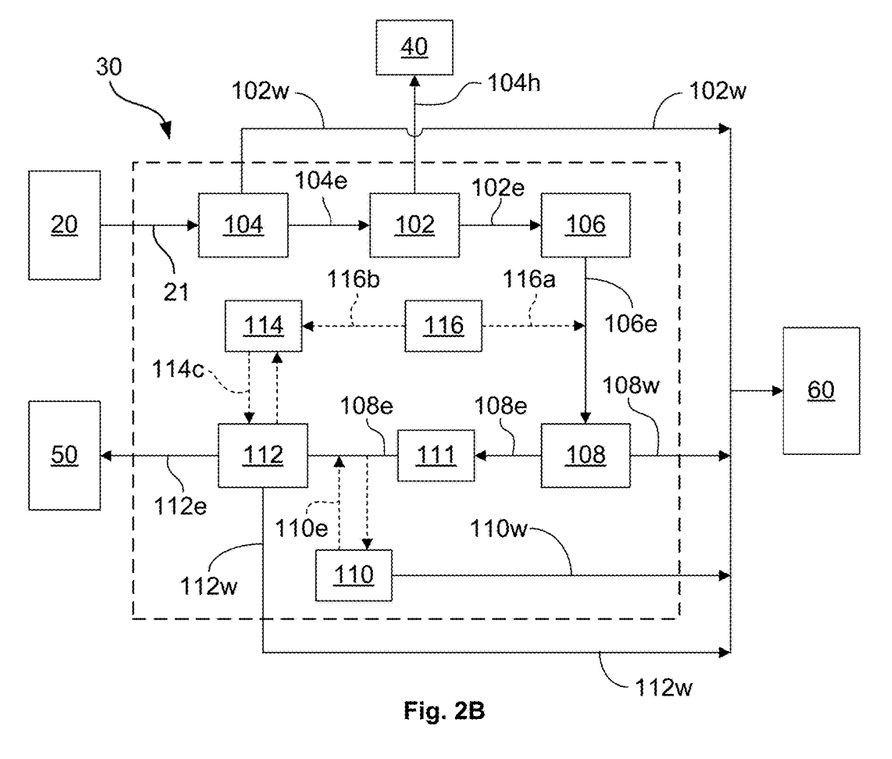
FIG. 2B is a schematic depiction of another illustrative embodiment of the wastewater treatment system shown in FIG. 1.

After floc separation, the wastewater stream 21 may then be further treated using the ultrafiltration (UF) membrane apparatus 112, which may include one or more separation membranes. In at least some embodiments, the separation membranes may be, for example, silicon carbide (SiC) or polyamide separation membranes and the like that are substantially chemically inert and thermally resistant, and which may provide a relatively higher flux than other comparable membrane materials. For example, the use of silicon carbide material for the separation membranes may be particularly suitable in certain applications due to its relatively high hydrophility and its general overall robustness towards the cleaning chemicals that are used for cleaning the ultrafiltration membrane apparatus 112. Additionally, the membranes may be coated so as to further enhance flux and reduce the tendency for fouling. Furthermore, in at least one embodiment, the wastewater stream 21 may first be polished in the filter apparatus 110 so as to remove additional solids from the stream 21 prior to being treated with the ultrafiltration membrane apparatus 112.

Once the wastewater stream 21 has passed through the treatment system 30, the treated water 50 exiting the system 30 may then be handled as may be appropriate in view of the degree of treatment and the desired method disposition of the water 50. For example, in some embodiments, the treated water 50 may be disposed of by reinjection into subterranean formation or discharge into waterways, as previously described. In other embodiments, the treated water 50 may be reused for hydraulic fracturing operations, i.e., the water 50 may be reformulated as may be necessary so as to have specifically desired rheological properties. In still further embodiments, the treated water exiting the treatment system 30 may be subjected to further treatment so as to remove additional components and/or contaminants as needed to aid in meeting the desired fracing fluid formulation.

Turning now to FIG. 2A, one exemplary embodiment of a wastewater treatment system 30 is schematically depicted and shows one illustrative configuration of a wastewater treatment flow regime in accordance with the present disclosure. As shown in FIG. 2A, the wastewater stream 21 flows from the wastewater storage tank or retention pond 20 to the wastewater treatment system 30, where it may initially enter the desilting or desanding hydrocyclone 102. In some embodiments, the desanding hydrocyclone 102 may be of a relatively compact design, such as an inline desilter/desander that is adapted to separate solids from a single phase liquid feed stream, or from a multi-phase gas-liquid feed stream. For example, in certain illustrative embodiments, the desanding hydrocyclone 102 may be a single liner configuration, whereas in other embodiments it may be a multiple liner configuration, depending on the specific unit design and overall desilting/desanding requirements.

In operation, the wastewater stream 21 may enter an inlet chamber of the desanding hydrocyclone 102, from which it then flows into the liner (or liners) of the hydrocyclone 102 and is set into rotation by the stationary swirl element (or elements). As a result of the centrifugal force created by the swirling effect of the wastewater stream 21, the lighter phases (e.g., liquid and/or gas) that make up the stream 21 will tend to migrate toward the center of the liner(s), whereas the denser phase (e.g., a slurry of entrained solids) moves toward the outer wall of the liner(s). The separated slurry is then discharged through a reject outlet as a waste stream 102w. In some embodiments, the waste stream 102w may initially be discharged into a collection compartment or vessel of the desanding hydrocyclone 102. The collection vessel may be cleaned on either a continuous or intermittent basis, and the waste stream 102w cleaned from the collection vessel may be combined with other discarded contaminants and waste streams 60 and sent to an appropriate treatment apparatus, such as a thickening tank and the like, for treatment and eventual disposal. The lighter liquid and/or gas phases flow out of the desanding hydrocyclone 102 through an underflow outlet as a substantially desanded effluent 102e.

In certain embodiments, the desanding hydrocyclone 102 may be adapted to remove sand/silt particles from the wastewater stream 21 which have a size that is greater than approximately 10 μm. In other embodiments, the desanding hydrocyclone 102 may be adapted to remove particle sizes down to approximately 5 μm from the stream 21, depending on the specific design parameters and overall configuration of the hydrocyclone 102. In some illustrative embodiments, such as wherein the desanding hydrocyclone 102 is, for example, an inline desilter/desander, the solids removal efficiency may be approximately 85% or higher. Furthermore, in certain embodiments, the solids removal efficiency may be on the order of at least about 95%, whereas in at least one embodiment the efficiency may be as high as 98% or even higher. However, it should be understood that achieved solids removal efficiency may depend on the specific design and configuration of the hydrocyclone 102.

In certain configurations, the substantially desanded effluent 102e exiting the desanding hydrocyclone 102 may thereafter be sent to the deoiling hydrocyclone 104 for further separation treatment. For example, the deoiling hydrocyclone 104 may also be of a compact design, such as an inline hydrocyclone and the like. The deoiling hydrocyclone 104 operates in similar fashion to various hydrocyclones known in the art so as to separate the lower specific gravity liquid hydrocarbons from the higher specific gravity water and any entrained solids and/or other waste.

In operation, the desanded effluent 102e exiting the desanding hydrocyclone 102 may thereafter enter the deoiling hydrocyclone 104 in a tangential or circumferential fashion, and the swirling action induced effluent 102e by a stationary swirl element causes the lighter liquid hydrocarbons to move toward the center of the hydrocyclone 104 as the heavier water (with other heavy solids and waste) moves toward the outer wall. The separated hydrocarbons 104h are then discharged through the reject outlet of the deoiling hydrocyclone 104 and sent with other recovered hydrocarbons 40, e.g., to the operator, while the treated effluent 102e is discharged through the underflow outlet as a substantially desanded and deoiled effluent 104e.

In at least some embodiments, the deoiling hydrocyclone 104 may be adapted to remove approximately 90-95%, or even more, of the liquid hydrocarbons that may be present in the effluent 102e exiting the desanding hydrocyclone 102. For example, based on an inlet oil concentration that ranges between about 100-500 ppm (parts per million), the deoiling hydrocyclone 104 may reduce the oil content in the treated effluent 102e such that the effluent 104e has an oil concentration that ranges from about 25-100 ppm. In other embodiments, the deoiling hydrocyclone 104 may remove up to approximately 98% of the oil present in the effluent 102e, such that wastewater stream entering the deoiling hydrocyclone 104 with an inlet oil concentration of approximately 100-2500 ppm exits the deoiling hydrocyclone 104 as an effluent 104e having an oil concentration of about 10-40 ppm. However, it should be appreciated that the performance of the deoiling hydrocyclone 104 and the oil concentration present in the effluent 104e may vary from these ranges depending on numerous factors, such as the specific design configuration of the deoiling hydrocyclone 104 (e.g., diameter, number of liners, number of swirl vanes per liner, length of convergence sections, etc.) and the various process conditions that generally influence hydrocyclone separation efficiency, such as the density difference between the water and the entrained oil, water viscosity, flowrate through the hydrocyclone 104, oil droplet size distribution at the feed to the hydrocyclone 104, other constituents present in the effluent 104e, and the like.

After primary sand/silt and hydrocarbon separation processes have been performed on the wastewater stream 21 in the respective desanding/desilting and deoiling hydrocyclones 102 and 104, a primary treatment phase is performed on the desanded and deoiled effluent 104e by the wastewater treatment system 30. As shown in FIG. 2A, the effluent 104e leaving the deoiling hydrocyclone 104 may thereafter be sent to an electrocoagulation (EC) apparatus 106 for further treatment, where suspended solids, bacterial agents, and/or heavy metals and the like may be removed from the effluent 104e. In some embodiments, the electrocoagulation apparatus 106 may be a relatively compactly-designed "thincell" electrocoagulation system that utilizes a non-scaling sacrificial electrode design that minimizes electrode fouling and/or passivation.

The primary hydrocarbon and solids separation processes that are initially performed in the deoiling and desanding hydrocyclones 102 and 104 upstream of the electrocoagulation apparatus 106 beneficially reduce the foulant loading on electrocoagulation apparatus 106, thus facilitating its operation at an optimum level for an extended duration, as compared to wastewater treatment systems where an electrocoagulation system is used as the primary means of separating hydrocarbons and large solids particles from a wastewater stream. In such electrocoagulation systems, the greater presence of hydrocarbons and solids in the wastewater stream often leads to premature fouling and/or passivation of the electrodes. For example, when the hydrocarbon and solids content of the wastewater is high, fouling on the electrode surface can occur after only a few hours of operation, thus leading to an overall reduced efficiency of the electrocoagulation system, increased power consumption, a reduced quantity and size of bubble formation, and possibly even a complete failure of the system. While the rate of fouling of an electrocoagulation system can sometimes be reduced by changing the polarity of the electrodes at desired time intervals, the greater presence of hydrocarbons in a wastewater stream generally leads to more frequent shutdowns of the process for cleaning.

Typically, the electrocoagulation system cleaning process requires that the electrode housing be disassembled for manual cleaning, as air sparging and acid treatments generally have only a limited effect in cleaning the fouled electrodes. Such fouling often results in anywhere from a 20%-50% reduction in processing time between system shutdowns for additional cleaning. Furthermore, increase electrode fouling means that the electrode cell assemblies are exposed to additional wear and tear due to the disassembly and reassembly required for more frequent cleaning. Moreover, the potential for system leaks and exposure of personnel to the wastewater stream is increased, additional waste products are generated, and more frequent manual inspections for electrode cleanliness must be performed. Each of these factors therefore contribute to greater overall operating costs due in major part to the higher hydrocarbon and solids loading imposed on the electrocoagulation system that would otherwise not be present when the primary cyclonic separation provided by the deoiling and desanding hydrocyclones 102 and 104 are included in conjunction with the novel wastewater treatment system 30 of the present disclosure.

During treatment of the deoiled and desanded effluent 104e in the electrocoagulation apparatus 106, electroflocculated solids are created that are suspended in a bulk water phase, after which the electroflocculated solids are removed from the treated wastewater stream 21. For example, as shown in FIG. 2A, the effluent 106e exiting the electrocoagulation apparatus 106 may then flow into a floc separator 108 that is adapted to separate the electroflocculated solids from the bulk water phase of the effluent 106e. As noted previously, in at least some illustrative embodiments the floc separator 108 may be a compact floatation unit that is configured so as to provide optimal conditions for floc growth, and interaction with and removal of contaminants. Micro gas bubbles are mixed into the stream at the inlet and intermediate of the floc removal process, which optimizes floc lift in the separator vessels. In various embodiments, one, two, or three stages can be used for the mixing, floc growth, and separation stages, all of which may be performed inside of a single vessel, or divided over a plurality of vessels as the available skid space and process requirements may permit. Furthermore, in certain embodiments, a chemical conditioning apparatus 116 may be fluidly coupled to the outlet of the electrocoagulation apparatus 106, and may be used to deliver controlled dosages of chemical binding agents 116a—such as flocculants, coagulants, demulsifiers, water clarifiers, coagulation aids, and the like—to the wastewater stream 21 after it has been treated in the electrocoagulation apparatus 106. In some embodiments, the chemical binding agents 116a may act to bring the electroflocculated solids into tighter agglomerated masses so that the flocs can be more easily separated from the bulk water phase in the floc separator 108.

In certain embodiments, the separated flocs may be discharged from the floc separator 108 as a waste stream 108w that is sent to join other discarded contaminants and waste streams 60, e.g., for treatment in a thickening tank, whereas the supernatant flows out of the floc separator 108 as an effluent 108e, as is schematically depicted in FIG. 2A. Thereafter, the effluent 108e exiting the floc separator 108 may be sent to an ultrafiltration membrane apparatus 112 for further treatment prior to reuse and/or disposal. Additionally, in at least some embodiments, the effluent 108e may initially be sent to a buffer tank 111 as shown in FIG. 2A, which may be used to build up and hold a quantity of the effluent 108e prior to delivering at least a portion of the effluent 108e to the ultrafiltration membrane apparatus 112.

As noted above, the ultrafiltration membrane apparatus 112 may include, for example, one or more silicon carbide separation membranes that may be substantially chemically inert and thermally resistant. Depending on the specific application and design of the ultrafiltration membrane apparatus 112, the pore sizes in the separation membranes may be on the order of approximately from 0.5-0.04 µm. Furthermore, the separation membranes may be arranged for a cross-flow filtration scheme, thereby providing a greater degree of flexibility in terms of the total amount of suspended solids, hydrocarbons, bacteria, etc., that may still be present in the effluent 108e entering the ultrafiltration membrane apparatus 112.

As shown in FIG. 2A, waste materials separated from the effluent 108e may be discharged from the ultrafiltration membrane apparatus 112 as a waste stream 112w to join other discarded contaminants and waste streams 60, e.g., for treatment in a thickening tank. The treated water passing through the separation membranes, i.e., the treated permeate, then exits the apparatus 112 as an effluent 112e, where it may then be reused, e.g., as a component for fracing fluid, and/or disposed of in one or more of the manners noted above.

The wastewater treatment system 30 may further include a clean-in-place (CIP) apparatus 114 that is fluidly coupled to the ultrafiltration membrane apparatus 112, as shown in FIG. 2A. In certain embodiments, the clean-in-place apparatus 114 may be used to clean the ultrafiltration membrane apparatus 112 by periodically circulating a fluid 114c through the membrane apparatus 112 so as to flush and/or dissolve any foulant buildup of separated waste particles out of the apparatus 112. Clean-out waste 112w from the clean-in-place process may then be sent to join other waste streams 60, as previously described. In some embodiments, the chemical conditioning apparatus 116 may also be fluidly coupled to the clean-in-place apparatus 114 as shown in FIG. 2A. Depending on the cleaning requirements and cleaning frequency, the chemical conditioning apparatus 116 may provide a controlled flow of chemicals 116b—such as acids (e.g., hydrochloric or nitric acid), alkalines, surfactants, oxidants (e.g., bleach or peracetic acid) and/or detergents and the like—to the clean-in-place apparatus 114 so as to support the clean-in-place operation.

It should be understood by those of ordinary skill after a complete reading of the present disclosure that the performance benefits accruing to the electrocoagulation apparatus 106 due to the initial primary separation of hydrocarbons and solids particles from the wastewater stream in the deoiling and desanding hydrocyclones 102 and 104 may be equally applicable to the performance and efficiency of the ultrafiltration membrane apparatus 112. In particular, as a result of the reduced fouling and increased performance of the electrocoagulation apparatus 106 due to the comparatively low hydrocarbon and solids particles loading, the separation membranes of the ultrafiltration membrane apparatus 112 may also experience a reduced degree of fouling, and consequently a correspondingly higher flux, for an enhanced period of time. Moreover, the recovery of the ultrafiltration membrane apparatus 112 may also increase, and the demand for treatment chemicals 116b during the clean-in-place cycle may commensurately decrease.

In some embodiments, the wastewater treatment system 30 may also include a filter apparatus 110 that is adapted to "polish" the effluent 108e (supernatant) flowing from the floc separator 108 (or the buffer tank 111, when used) before it is sent to the ultrafiltration membrane apparatus 112, as shown in FIG. 2A. For example, in certain embodiments, the polishing filter apparatus 110 may be a simple bag filter apparatus that includes one or more filter bags that are adapted to remove particles that are larger than a predetermined size cut off, such as particle sizes in the range of approximately 5-100 µm and the like, so that minimal solids of a size that may prematurely foul the separation membranes do not pass through to the ultrafiltration membrane apparatus 112. In similar fashion to other treatment apparatuses of the wastewater treatment system 130, waste 110w from the filter apparatus 110 is sent to join other contaminants and waste streams 60, e.g., for treatment in a thickening tank, whereas a polished effluent 110e is sent to the ultrafiltration membrane apparatus 112 for further treatment, as described above.

FIG. 2B schematically illustrates another exemplary embodiment of a wastewater treatment system 30 in accordance with the present disclosure in which the wastewater treatment flow regime is different from that shown in FIG. 2A and describe above, wherein the wastewater stream 21 may be treated by the deoiling hydrocyclone 104 prior to a desanding/desilting treatment in the desanding hydrocyclone 102. For example, as shown in exemplary embodiment depicted in FIG. 2B, the wastewater stream 21 flowing from the wastewater storage tank 20 to the wastewater treatment system 30 may first enter the deoiling hydrocyclone 104, which is operated an describe above so as to separate the lower specific gravity hydrocarbons from the higher specific gravity water and entrained solids. As described with respect to FIG. 2A above, the separated hydrocarbons 104h are then discharged through the reject outlet of the deoiling hydrocyclone 104 and sent with other recovered hydrocarbons 40 while the treated wastewater stream is discharged through the underflow outlet of the deoiling hydrocyclone 104 as a substantially deoiled effluent 104e. Thereafter, the substantially deoiled effluent 104e exiting the deoiling hydrocyclone 104 may be directed to the desanding hydrocyclone 102 for further separation treatment, where entrained sand and/or other solid material particles may be separated out of the deoiled effluent 104e as the waste stream 102w, which is discharged from the reject outlet of the desanding hydrocyclone 102, and the treated wastewater stream is discharged through the underflow outlet as a substantially deoiled and desanded effluent 102e.

As with the embodiment depicted in FIG. 2A, after primary sand/silt and hydrocarbon separation processes have been performed on the wastewater stream 21 in the respective deoiling and desanding hydrocyclones 104 and 102, respectively, the deoiled and desanded effluent 102e leaving the desanding hydrocyclone 102 is then sent to the electrocoagulation apparatus 106 for further treatment, where suspended solids, bacterial agents, and/or heavy metals and the like are removed from the effluent 102e. Thereafter, flow through and treatment by the wastewater treatment system 30 shown in FIG. 2B may continue substantially as described with respect to FIG. 2A above.

Figure 3:
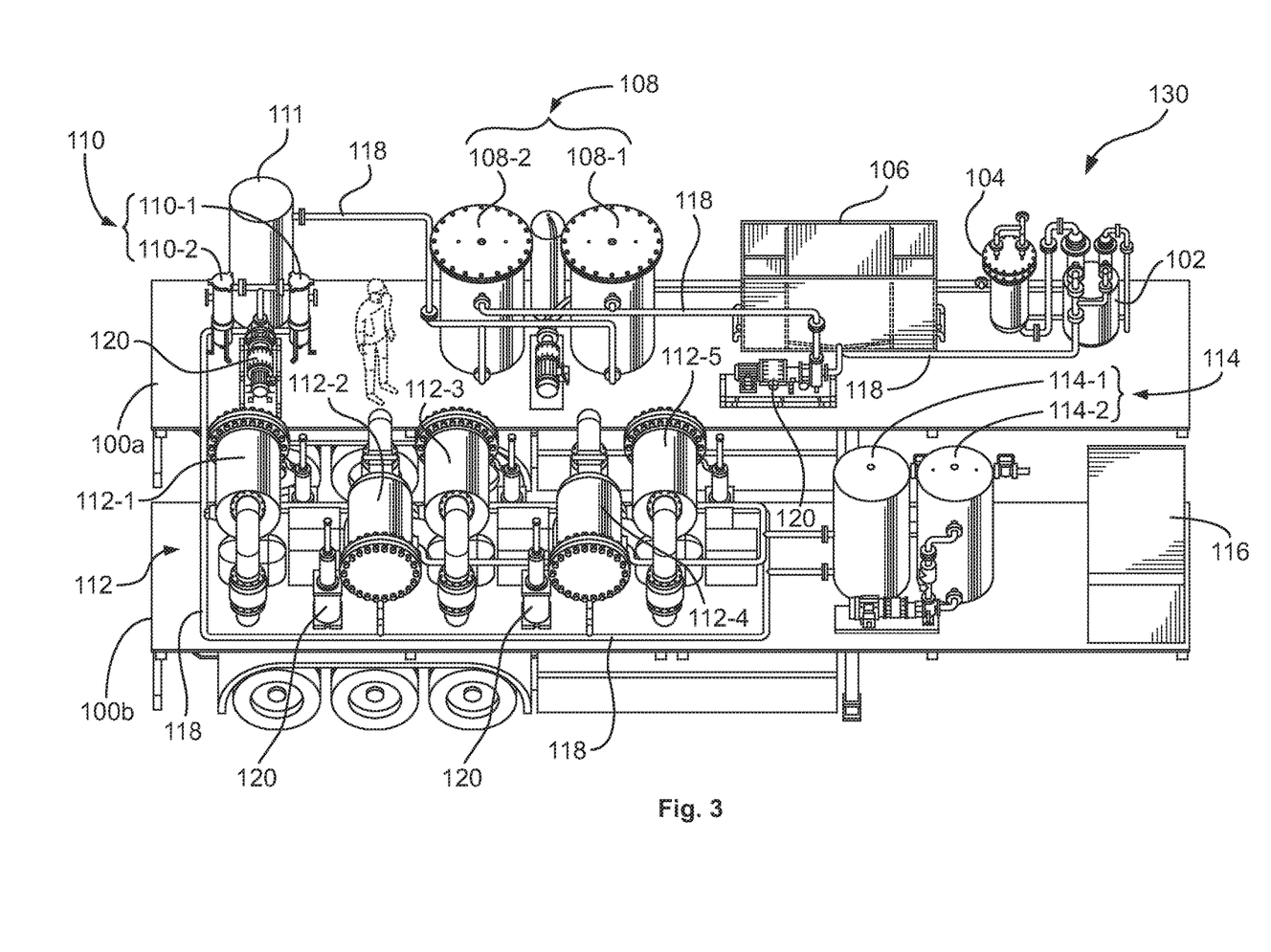
FIG. 3 is a perspective view of one exemplary embodiment of a mobile wastewater treatment system based on the schematically depicted wastewater treatment systems shown in FIGS. 2A and 2B.

FIG. 3 is a perspective view of an exemplary mobile wastewater treatment system 130 in accordance with one embodiment of the present disclosure that may be substantially configured in similar fashion to either of the schematically depicted wastewater treatment systems 30 that are shown in FIGS. 2A and 2B. As shown in FIG. 3, the mobile wastewater treatment system 130 may include a variety of wastewater treatment apparatuses, such as one or more of the various apparatuses schematically that are shown in FIGS. 2A and 2B and described above. For example, the mobile wastewater treatment system 130 may include a desanding hydrocyclone 102, a deoiling hydrocyclone 104, an electrocoagulation apparatus 106, and a floc separator 108. Additionally, the mobile treatment system 30 may also include a buffer tank 111, a polishing filter apparatus 110, an ultrafiltration membrane apparatus 112, a clean-in-place apparatus 114 for the membrane apparatus 112, and a chemical conditioning apparatus 116 for delivering controlled amounts of chemicals to the electrocoagulation apparatus 106 and/or the clean-in-place apparatus 114. Furthermore, an interconnecting piping system 118 and one or more pumps 120 may facilitate fluid communication between the various wastewater treatment apparatuses shown in FIG. 3.

Depending on the design and wastewater treatment capacity of the mobile wastewater treatment system 130, one or more of the various treatment apparatuses described above may include a plurality of treatment vessels or treatment sub-elements. For example, as shown in the illustrative embodiment of the mobile wastewater treatment system 130 depicted FIG. 3, the floc separator 108 may include a plurality of compact floatation units 108-1, 108-2, the polishing filter apparatus 110 may include a plurality of polishing (e.g., bag) filters 110-1 and 110-2, and the ultrafiltration membrane apparatus 112 may include a plurality of membrane separation units 112-1, 112-2, etc. Furthermore, in certain embodiments the clean-in-place apparatus 114 may also include a plurality of vessels 114-1, 114-2 and the like.

In some embodiments, any one or more of the various wastewater treatment apparatuses 102, 104, 106, 108, 110, 111, 112, 114, and/or 116, as well as any other required supporting equipment (e.g., piping, pumps, etc.) may be positioned and appropriately arranged on one or more trailers for transportation to and between various oilfield sites. For example, as shown in the illustrative embodiment of FIG. 3, the mobile wastewater treatment system 130 may include two trailers 100a and 100b configured as shown, which may be transported over roads and highways by truck (not shown) to particular locations where onsite wastewater treatment processing may be desired. In other embodiments, the mobile wastewater treatment system 130 may be made up of one or more mobile or movable skid-mounted units that are arranged and configured in similar fashion to that depicted on the trailers 100a/b, which may be transported via truck (not shown) and offloaded onsite for performing wastewater treatment as described above.

Furthermore, in various illustrative embodiments, any or all of the trailer-mounted or movable skid-mounted wastewater treatment apparatuses that may be included as part of the mobile wastewater treatment system 130 may be of a substantially compact design. For example, as noted previously, one or both of the desanding and deoiling hydrocyclones 102, 104 may be inline hydrocyclones, and the floc separator(s) 108-1, 108-2 may be compact flotation units and the like. Similarly, the electrocoagulation apparatus 106 may be a "thincell" system. Moreover, the ultrafiltration membrane apparatus 112 may be made up of a plurality of compact membrane separation units 112-1, 112-2, 112-3, 112-4, 112-5, as previously described. In this way, the overall footprint of each trailer 100a/b or mobile/movable skid assembly of the wastewater treatment system 130 may be substantially minimized. Additionally, and depending on the overall treatment requirements for a given well site, some system configurations may only require a single mobile trailer or a single movable skid, thus enhancing the overall mobility of the wastewater treatment system 130 and reducing transportation costs to and between various oilfield sites.

The present disclosure therefore describes various wastewater treatment systems and methods for treating oilfield wastewater that would allow the treated wastewater to be disposed of in an appropriate manner, or reused for additional oil and gas drilling and/or completion activities. Additionally, the wastewater treatment systems disclosed herein may be readily designed, arranged, and configured as mobile systems that would allow for relatively easy transportation over roads and highways between oilfield sites.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown. It is therefore evident that the particular embodiments disclosed above may be altered or modified and all such variations are considered within the scope and spirit of the invention. Accordingly, the protection sought herein is as set forth in the claims below.

What is claimed:

1. A wastewater treatment system, comprising:
    a desanding hydrocyclone;
    a deoiling hydrocyclone;
    an electrocoagulation apparatus that is adapted to receive a flow of treated wastewater from said desanding and deoiling hydrocyclones;
    a floc separator that is adapted to receive a flow of a first effluent from said electrocoagulation apparatus; and
    an ultrafiltration membrane apparatus that is adapted to receive at least a portion of a flow of a second effluent from said floc separator.

2. The wastewater treatment system of claim 1, wherein said wastewater treatment system is a mobile wastewater treatment system that comprises at least one mobile trailer or at least one movable skid, wherein each of said desanding hydrocyclone, said deoiling hydrocyclone, said electrocoagulation apparatus, said floc separator, and said ultrafiltration membrane apparatus are mounted on said at least one mobile trailer or said at least one movable skid.

3. The wastewater treatment system of claim 1, wherein said desanding hydrocyclone is adapted to receive a flow of wastewater, separate solids particles from said flow of wastewater, and direct a flow of a third effluent to said deoiling hydrocyclone, and wherein said deoiling hydrocyclone is adapted to separate hydrocarbons from said flow of said third effluent and discharge said flow of treated wastewater as a fourth effluent from said deoiling hydrocyclone.

4. The wastewater treatment system of claim 3, wherein said desanding hydrocyclone is adapted to separate solids particles having particle sizes down to approximately 10 μm from said flow of wastewater.

5. The wastewater treatment system of claim 1, wherein said deoiling hydrocyclone is adapted to receive a flow of wastewater, separate hydrocarbons from said flow of wastewater, and direct a flow of a third effluent to said desanding hydrocyclone, and wherein said desanding hydrocyclone is adapted to separate solids particles from said flow of said third effluent and discharge said flow of treated wastewater as a fourth effluent from said desanding hydrocyclone.

6. The wastewater treatment system of claim 1, wherein said electrocoagulation apparatus is adapted to form agglomerated solids from at least one of suspended solids, bacterial agents, and heavy metals present in said flow of treated wastewater.

7. The wastewater treatment system of claim 6, further comprising a chemical conditioning apparatus that is fluidly coupled to said electrocoagulation apparatus, said chemical conditioning apparatus being adapted to deliver a controlled dosage of at least one chemical binding agent to said first effluent flowing from said electrocoagulation apparatus so as to further facilitate said formation of said agglomerated solids.

8. The wastewater treatment system of claim 1, wherein said floc separator is adapted to separate agglomerated solids from said flow of said first effluent.

9. The wastewater treatment system of claim 1, wherein said ultrafiltration membrane apparatus is adapted to separate solids particles from said at least said portion of said flow of said second effluent.

10. The wastewater treatment system of claim 1, further comprising a polishing filter apparatus that is adapted to receive said at least said portion of said flow of said second effluent from said floc separator, separate solids particles having particle sizes in a range of approximately 5-100 µm from said flow of said second effluent, and thereafter deliver said at least said portion of said flow of said second effluent to said ultrafiltration membrane apparatus.

11. The wastewater treatment system of claim 10, wherein said polishing filter apparatus comprises at least one filter bag.

12. The wastewater treatment system of claim 1, wherein said ultrafiltration membrane apparatus comprises one or more separation membranes.

13. The wastewater treatment system of claim 12, wherein a material of said one or more separation membranes comprises silicon carbide.

14. The wastewater treatment system of claim 12, further comprising a clean-in-place apparatus that is fluidly coupled to said ultrafiltration membrane apparatus, wherein said clean-in-place apparatus is adapted to periodically perform a clean-in-place process so as to clean said one or more separation membranes.

15. The wastewater treatment system of claim 14, further comprising a chemical conditioning apparatus that is fluidly coupled to said clean-in-place apparatus, said chemical conditioning apparatus being adapted to deliver a controlled amount of at least one chemical to said clean-in-place apparatus during said clean-in-place process.

16. A mobile wastewater treatment system, comprising:
at least one mobile trailer or movable skid;
a desanding hydrocyclone and a deoiling hydrocyclone mounted on said at least one mobile trailer or movable skid, wherein said desanding hydrocyclone and said deoiling hydrocyclone are adapted to receive a flow of wastewater;
an electrocoagulation apparatus and a floc separator mounted on said at least one mobile trailer or movable skid, wherein said electrocoagulation apparatus is adapted to receive a flow of a substantially desanded and deoiled effluent exiting one of said desanding hydrocyclone and said deoiling hydrocyclone, and wherein said floc separator is adapted to remove agglomerated solids from a flow of an effluent exiting said electrocoagulation apparatus; and
an ultrafiltration membrane apparatus mounted on said at least one mobile trailer or movable skid, wherein said ultrafiltration membrane apparatus is adapted to remove solids particles from at least a portion of a flow of an effluent exiting said floc separator.

17. The wastewater treatment system of claim 16, wherein said deoiling hydrocyclone is adapted to receive a flow of an effluent exiting said desanding hydrocyclone and said electrocoagulation apparatus is adapted to receive a flow of an effluent exiting said deoiling hydrocyclone.

18. The wastewater treatment system of claim 16, wherein said desanding hydrocyclone is adapted to receive a flow of an effluent exiting said deoiling hydrocyclone and said electrocoagulation apparatus is adapted to receive a flow of an effluent exiting said desanding hydrocyclone.

19. The wastewater treatment system of claim 16, wherein at least one of said deoiling hydrocyclone and said desanding hydrocyclone is an inline hydrocyclone.

20. The wastewater treatment system of claim 16, wherein said floc separator comprises a compact floatation unit.

21. A method of treating wastewater with a wastewater treatment system, the method comprising:
directing a flow of wastewater to said wastewater treatment system;
separating hydrocarbons and first solids particles from said flow of wastewater with first and second hydrocyclones of said wastewater treatment system;
treating a flow of a first effluent exiting one of said first and second hydrocyclones in an electrocoagulation apparatus of said wastewater treatment system so as to form agglomerated solids from waste material present in said flow of said first effluent;
removing said agglomerated solids from a flow of a second effluent exiting said electrocoagulation apparatus with a floc separator of said wastewater treatment system; and
separating second solids particles from at least a portion of a flow of a third effluent exiting said floc separator in an ultrafiltration membrane apparatus of said wastewater treatment system.

22. The method of claim 21, wherein separating said hydrocarbons and said first solids particles from said flow of wastewater comprises:
receiving said flow of wastewater with said first hydrocyclone;
separating said hydrocarbons from said flow of wastewater in said first hydrocyclone;
directing a flow of a fourth effluent comprising a portion of said flow of wastewater from said first hydrocyclone to said second hydrocyclone; and
separating said first solids particles from said flow of said fourth effluent in said second hydrocyclone, said flow of said first effluent exiting said second hydrocyclone.

23. The method of claim 21, wherein separating said hydrocarbons and said first solids particles from said flow of wastewater comprises:
receiving said flow of wastewater with said second hydrocyclone;
separating said first solids particles from said flow of wastewater in said second hydrocyclone;
directing a flow of a fourth effluent comprising a portion of said flow of wastewater from said second hydrocyclone to said first hydrocyclone; and
separating said hydrocarbons from said flow of said fourth effluent in said first hydrocyclone, said flow of said first effluent exiting said first hydrocyclone.

24. The method of claim 21, further comprising mounting each of said first and second hydrocyclones, said electrocoagulation apparatus, said floc separator, and said ultrafiltration membrane apparatus on at least one mobile trailer or at least one movable skid, the method further comprising positioning said wastewater treatment system adjacent to a supply of wastewater and directing said flow of said wastewater to said wastewater treatment system from said supply of wastewater.

25. The method of claim 21, further comprising using a flow of a fourth effluent exiting said ultrafiltration membrane apparatus to formulate a hydraulic fracturing fluid.

26. The method of claim 25, further comprising performing a hydraulic fracturing operation using said hydraulic fracturing fluid formulated from said flow of said fourth effluent.

27. The method of claim 21, wherein forming said agglomerated solids further comprises delivering a controlled dosage of at least one chemical binding agent from a chemical conditioning apparatus of said wastewater treatment system to said second effluent flowing from said electrocoagulation apparatus.

28. The method of claim 21, further comprising, prior to separating said second solids particles from said at least said portion of said flow of said third effluent, separating third solids particles from said flow of said third effluent in a polishing filter apparatus.

29. The method of claim 21, further comprising fluidly coupling a clean-in-place apparatus to said ultrafiltration membrane apparatus and performing a clean-in-place process on said ultrafiltration membrane apparatus with said clean-in-place apparatus.

\* \* \* \* \*